United States Patent [19]

Heimlich

[11] Patent Number: 4,830,225

[45] Date of Patent: May 16, 1989

[54] FLOWABLE MATERIAL DISPENSER

[75] Inventor: Philip F. Heimlich, Coral Springs, Fla.

[73] Assignee: hiMEDICS, Inc., Hollywood, Fla.

[21] Appl. No.: 28,759

[22] Filed: Mar. 23, 1987

[51] Int. Cl.⁴ .............................................. G01F 11/28
[52] U.S. Cl. .................................... 222/153; 222/440; 222/444; 222/41; 222/307
[58] Field of Search ....................... 222/31, 46, 47, 48, 222/153, 41, 162, 304, 305, 306, 307, 308, 363, 438, 440, 444, 434, 435, 282, 287; 70/360, 363, 387; 220/210, DIG. 32, DIG. 33; 215/207, 302

[56] References Cited

U.S. PATENT DOCUMENTS

| | | | |
|---|---|---|---|
| 1,513,373 | 10/1924 | Corporon | 222/306 |
| 2,722,345 | 11/1955 | Van Boren | 222/440 X |
| 3,013,698 | 5/1960 | Gordan et al. | |
| 3,064,858 | 11/1962 | Ziegler | 222/308 X |
| 3,090,524 | 9/1960 | Corcoran | |
| 3,145,883 | 11/1961 | Geroux | |
| 3,347,415 | 10/1967 | Strom | 222/48 |
| 4,151,933 | 1/1977 | Myers | |

FOREIGN PATENT DOCUMENTS

| | | | |
|---|---|---|---|
| 401850 | 3/1970 | Australia | 222/306 |
| 7601166 | 6/1975 | France | |

Primary Examiner—Joseph J. Rolla
Assistant Examiner—S. B. Parker
Attorney, Agent, or Firm—Hayes & Reinsmith

[57] ABSTRACT

A dispenser for flowable materials in which the flowable material is moved from a reservoir for such materials into a variable volume measuring chamber, the volume of which is adjustable only by an external key, and thereafter to a discharge opening remote from the measuring chamber, which opening has a closure to control dispersion of the granules.

8 Claims, 5 Drawing Sheets

FLOWABLE MATERIAL DISPENSER

BACKGROUND OF THE INVENTION

This invention relates to a device for containing, measuring and dispensing flowable materials and, in particular, to such a device which is hand held and hand operable.

The prior art discloses various flowable material dispensing devices containing a measuring chamber having a variable volume may be adjusted by rotating an externally accessible known which causes the volume of the chamber to change. Among these disclosures are those in U.S. Pat. Nos. 3,013,698 to Gordan et al, 3,090,524 to Corcoran, 3,145,883 to Geroux, 4,151,933 to Myers, and French patent application No. 2,298,091. In many instances it is desirable that the adjustment for such variable volume measuring and dispensing devices be made relatively inaccessible to ready adjustment, yet easily adjusted when so desired. This is especially true when such devices are used to measure and dispense flowable materials for human consumption, for example, powdered or granular drugs and the like. Where such devices are brought into the home for consumer use, it is important that changes to the measuring volume of the dispenser be made relatively inaccessible to adjustment either inadvertently or by unauthorized persons such as children.

SUMMARY OF THE INVENTION

It is therefor a principal object of the present invention to provide a device for measuring and dispensing flowable material in which the adjustment of the measured volume of flowable material to be dispensed is relatively inaccessible yet may be easily made by authorized persons when desired.

It is another object of the present invention to provide an improved device for measuring and dispensing flowable material which is easily assembled, formed from a minimum number of parts, low in cost, and which can be disposed of when the flowable material has been exhausted.

It is another object of the present invention to provide an improved device for measuring and dispensing flowable materials which is relatively child-proof in adjustment.

It is a further object of the present invention to provide an improved measuring and dispensing device which may only be adjusted by means of a key.

Other objects will be in part obvious and in part pointed out in more detail hereinafter.

The dispenser of this invention generally meets the objects by providing an adjustable volume chamber for the material to be dispensed, the volume being adjustable only by removable key means inserted from the exterior of the chamber.

A better understanding of the objects, advantages, features, properties and relations of the invention will be obtained from the following detailed description and accompanying drawings which are set forth in an illustrative embodiment and are indicative of the key in which the principles of the invention are employed.

DETAILED DESCRIPTION OF THE INVENTION

Figure 1:
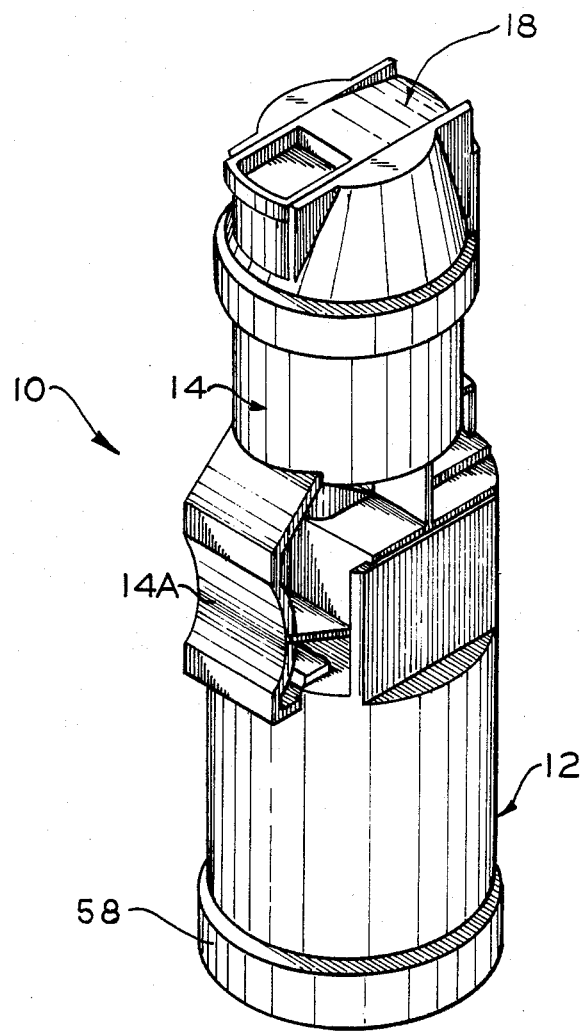
FIG. 1 is a perspective view of one embodiment of the present invention.
Figure 2:
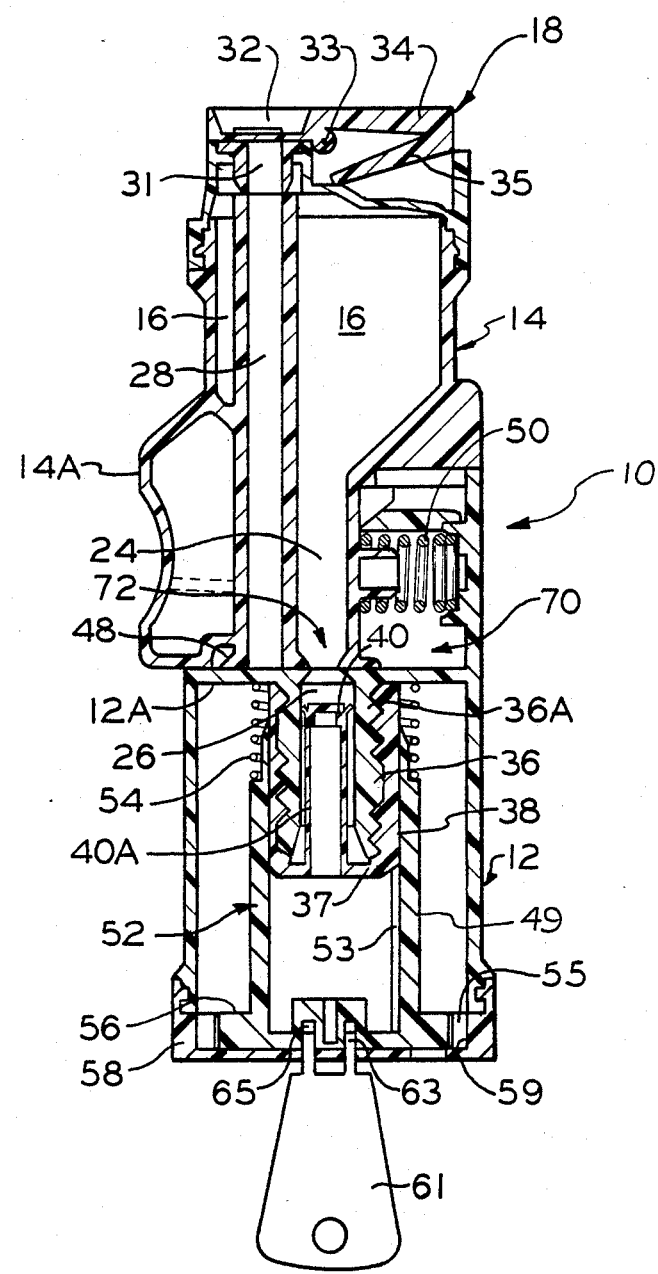
FIG. 2 is a cross section of the embodiment of FIG. 1 in an upright measuring position.

Directional terms are used herein in reference to the dispenser in its normal upright measuring position in FIGS. 1 and 2, but it is to be understood that such directional terminology is employed for convenience of description and it is not to be regarded in any way as limiting the invention.

In its preferred embodiment, the present invention is an improvement to the Flowable Material Dispenser described in U.S. Pat. No. 4,579,256, the subject matter of which is incorporated herein by reference. The drawings of this invention show a complete dispenser including the improved cap disclosed and claimed in my copending application Ser. No. 029,437 filed this same day.

In FIG. 1 there is shown a preferred embodiment of the present invention wherein the measuring and dispensing device is of size and shape so as to be hand operable. Preferably the device components are made of plastic or other light weight material which is of economical construction to permit disposal of the device after the contents are exhausted. The present invention is adapted for flowable materials in general, but is especially adapted for solid materials in granular, comminuted or pulverulent form.

The device of this invention is shown in its normal upright measuring position in FIGS. 1 and 2. The dispensing device or dispenser 10 comprises a vessel 14 slidably mounted over a housing 12. Vessel 14 contains a reservoir 16 for the flowable material as well as a discharge passageway 28, each of which may be alternately slid into communication with a measuring chamber 26 in housing 12 by translational motion of vessel 14 effected by gripping knob 14A with the fingers of the hand holding the device housing 12. As illustrated, spring 50 biases vessel 14 into a normal position shown in FIG. 2 wherein reservoir 16 communicates with measuring chamber 26. A cover assembly 18 seals the discharge outlet of the vessel 14.

In the cross sectional view of FIG. 2, dispenser 10 is shown in its upright measuring position. Reservoir 16 formed within vessel 14 has a lower fill passageway 24 extending toward and communicating with measuring chamber 26 below in housing 12. To fill measuring chamber 26 it is merely necessary to slidably position lower fill passageway 24 over chamber 26 and allow the flowable material in reservoir 16 to be gravity-fed thereto. Adjacent to reservoir 16 in vessel 14 is discharging passageway 28 for the measured flowable material which extends from the lower portion of vessel 14 to the upper discharging end.

Vessel 14 may be translationally slid relative to housing 12 so that measuring chamber 26 in housing 12 is out of communication with reservoir 16 and in communication with dispensing passageway 28. As shown in FIG.

3 the device 10 is then inverted from its position in FIG. 2 (the key which is normally removed is shown in phantom lines) to allow the contents of measuring chamber 26 to be dispensed through passageway 28 and out through discharge opening 31 into a suitable receptacle. The width of the lower portion of the wall which separates the reservoir lower fill passageway 24 and dispensing passageway 28 is wide enough to prevent the flow of granules from reservoir 16 to passageway 28 through measuring chamber 26. Accordingly, reservoir 16 is never in communication with dispensing passageway 28 during any portion of the translational sliding motion between measuring and dispensing positions.

The smooth central bore of measuring chamber 26 is formed in the wall of housing extension 36. The outer surface of extension 36 is conventionally threaded and communicates with a piston sleeve 37 connected at its lower end to piston 40. In the preferred embodiment the multiple pitch assembly 36a is a quad thread with one thread removed to provide a single proper angular alignment with sleeve 37, thus rotation of piston sleeve 37 causes movement of piston 40 up and down in chamber 26 (toward and away, respectively, from vessel 14) to vary the volume of chamber 26. Thus, accurate measurement of flowable material is achieved by filling chamber 26 from reservoir 16, and, while still in the upright position, sliding vessel 14 to the dispensing position whereupon excess flowable material is removed by the lower lip of the wall separating passageways 24 and 28.

Figure 6:
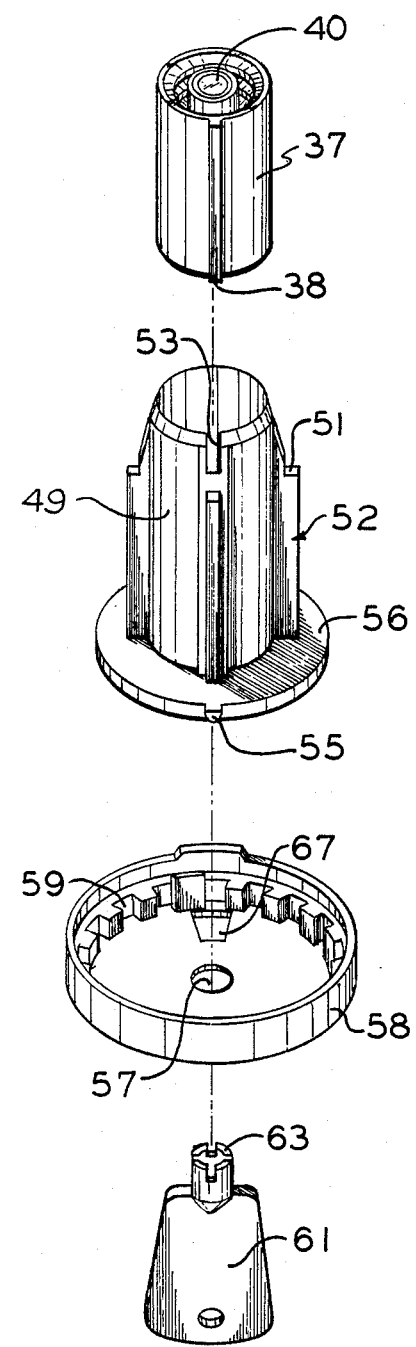
FIG. 6 is an exploded view, in perspective, of the preferred adjustment mechanism of the embodiment of FIG. 1.

To effect rotation of sleeve piston 37 and adjustment of chamber 26, there is provided in housing 12 an adjustment knob 52. Adjustment knob 52 is rotatable about its longitudinal axis and includes an annular sleeve 49 which slips over and is coaxial with piston sleeve 37. As seen in FIGS. 2 and 6, piston sleeve 37 contains a longitudinally extending tab 38 on its outer surface which slidably mates with corresponding adjustment knob slot 53 along the inner wall of adjustment knob annular sleeve 49. Thus, rotation of adjustment knob 52 effects rotational movement to piston sleeve 37 while allowing sleeve 37 to slide longitudinally. Base cover 58 snaps over the lower end of housing 12 and limits access to adjustment knob 52 except through a central key opening 57.

Figure 5:
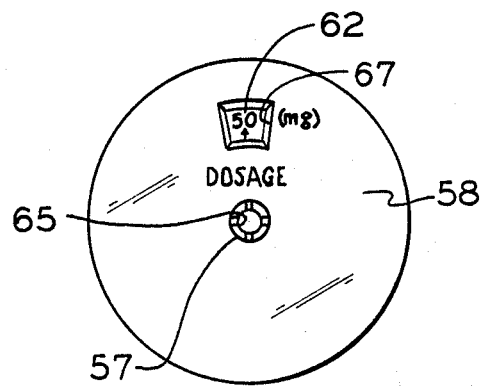
FIG. 5 is a bottom view of the lower adjustment end of the embodiment of FIG. 1.

To rotate adjustment knob 52, there is provided a key 61 having prongs or teeth 63 which are of a size which permits their insertion through key opening 57 and into engagement with corresponding complementary adjustment knob bosses or teeth 65 to permit rotation of adjustment knob 52; these features are most clearly seen in FIGS. 2 and 5. The size of base cover key opening 57 and the extension of adjustment knob teeth 65 are such that fingers or objects other than key 61 may not be used to adjust knob 52.

To further limit inadvertent adjustment of knob 52, there is provided a "push to turn" feature utilizing key 61. The lower end of adjustment knob 52 includes a flanged head 56 on which is provided at least one detent tab 55 which may be longitudinally slid into corresponding detent slots 59 in the base cover to prevent rotation of adjustment knob 52. Adjustment knob 52 is longitudinally slidable with respect to housing 12 on piston sleeve 37 so that detent tab 55 may be slid upward and out of detent slot 59 thereby permitting rotation of knob 52. A compression spring 54 between the upper transverse wall of housing 12 and a shoulder 51 on adjustment knob 52 biases the detent tab 55 into engagement with a detent slot 59. Thus, in order to effect rotation of adjustment knob 52, the key teeth 63 of key 61 must be inserted into engagement with adjustment knob 52 and pushed longitudinally inward and upward to disengage the detent tab 55 and slot 59. key 61 may then be rotated to rotate adjustment knob 52.

As seen in FIG. 5, the housing 12 base cover 58 is provided with a base cover opening 67 which permits viewing of graduated indicia 62 on the lower face of adjustment knob head 56. The micrometer indicia 62 indicates a dosage level or other indication of volume of measuring chamber 26 which has been provided by suitable rotation of adjustment knob 52, piston sleeve 36 and piston 40. Upon pushing and turning key 61 to adjust knob 52, the desired dosage level may be viewed at the housing base cover 58.

To facilitate and control dispensing of hard particles of granular material, the present invention also provides a cover member 18 (FIGS. 1, 2, 3 and 4) over vessel 14 to break the momentum of granular particles being dispensed into a receptical as device 10 is inverted.

Figure 3:
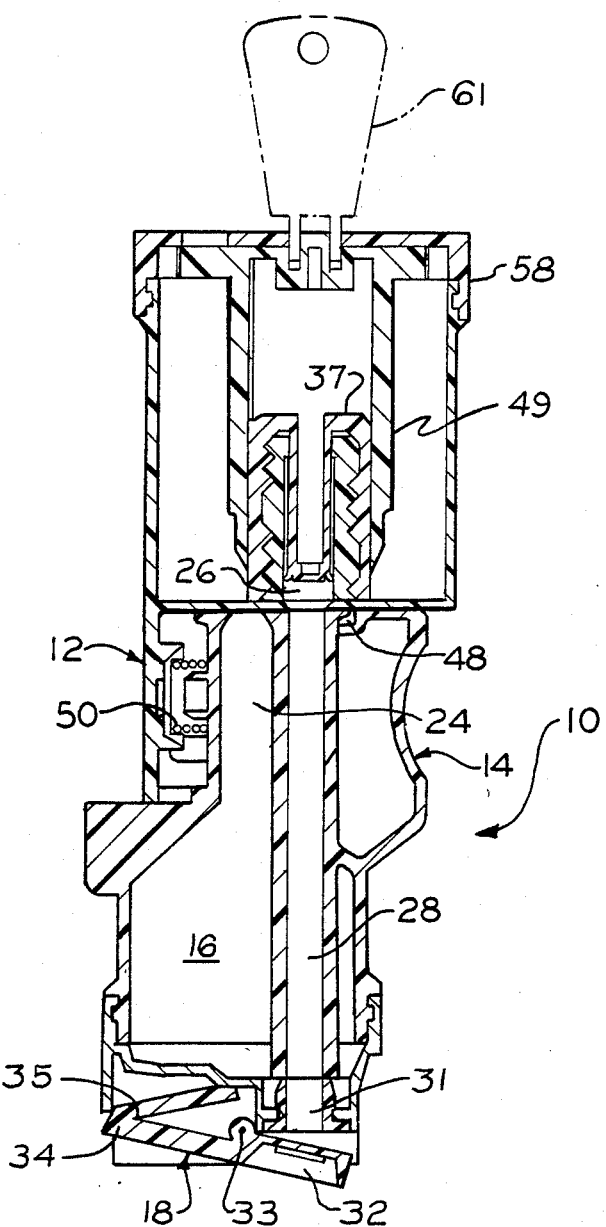
FIG. 3 is a cross section of the embodiment of FIG. 1 in an inverted dispensing position.
Figure 4:
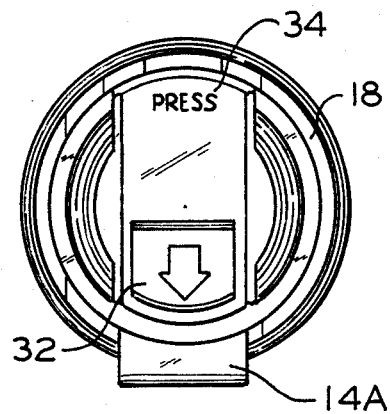
FIG. 4 is an end view of the upper outlet end of the embodiment of FIG. 1.

For completeness, a description of the cover feature is included in this application but, it forms the subject of my copending application Ser. No. 029,437. Turning to FIGS. 2 and 3, cover 18 includes a discharge opening 31 which is connected to the upper end of discharge passageway 28 and a cap 32 which is pivotable about an axis 33 between an opened position (FIG. 3) and a closed position (FIG. 2). An extension 34 on cap 32 is provided so that a finger or, preferably the thumb, e.g., of the hand grasping the device 10 may be utilized to open cap 32 and allow granular particles to be dispensed from discharge opening 31. A spring member 35 is molded into extension 34 to act against the lower portion of cover 18 and bias cap 32 into its closed position. A suitable seal (not shown) is provided between discharge opening 31 and cap 32 to prevent contamination of the discharge passageway 28 and other interior contents of dispenser 10 when the cap is closed.

As shown in the dispensing position in FIG. 3, the opening provided by open cap member 32 is such that particles falling from measuring chamber 26 through dispensing passageway 28 and out of discharge opening 31 must impact the interior of the cap 32, even if the device 10 is held at some dispensing angle other than the vertical dispensing position as shown in FIG. 3. By providing this feature that granular particles must impact cap 32 as they fall over the length of discharge passageway 28, the cap 32 ensures that the momentum of the particles is greatly reduced as they are dispensed onto a spoon or other receptacle. Consequently, the common effect of hard granular particles bouncing out of the spoon or other receptacle is prevented. Preferably, cap 32 will remain closed until all of the granular particles to be dispensed are at the discharge opening 31 to ensure that particle momentum is as low as possible as the particles are being dispensed.

The momentum-breaking feature of cover assembly 18 has been found to be especially useful in dispensing hard spherical granules of 0.023 inches diameter to 0.047 inches diameter where the length of the discharge passageway for such granules is substantially equal to or more than 0.5 inches.

As will be apparent to persons skilled in the art, various modifications, adaptations and variations of the foregoing specific disclosure can be made without departing from the spirit and scope of this invention.

Having thus described the invention, what is claimed is:

1. A flowable material dispenser comprising a housing, variable volume chamber means in the housing for measuring a predetermined amount of the flowable material, outlet means for dispensing measured amounts of the flowable material from the chamber means, key operable means rotatable for varying the volume of the chamber means the housing supporting, the key operable means for linear movement between a locked position and unlocked position, the key operable means in locked position being in interfering relation to the housing for securing the key operable means against rotation relative to the housing, the key operable means in unlocked position being in non-interfering relation to the housing for permitting rotation of the key operable means relative to the housing to vary the volume of the chamber means, and biasing means for urging the key operable means in locked position.

2. The dispenser of claim 1 wherein the interfering relation is effected by one of the housing and key operable means containing a detent tab and the other of the housing and key operable means containing a complementary detent slot for receiving the detent tab in locked position, and wherein the biasing means comprises a spring for urging the detent tab into the detent slot.

3. A flowable material dispenser comprising a housing, variable volume chamber means in the housing for measuring a predetermined amount of flowable material, outlet means for dispensing measured amounts of flowable material from the chamber means, and key operable means rotatable for varying the volume of the chamber means, the housing supporting the key operable means for linear movement between a locked position and unlocked position, the key operable means in locked position being in interference with the housing for restricting rotary movement of the key operable means relative to the housing while permitting said linear movement between said locked and unlocked positions, the key operable means in unlocked position being free to rotate relative to the housing for varying the volume of the chamber means in response to rotation of the key operable means for selectively dispensing a predetermined volume of flowable material from the chamber means.

4. The dispenser of claim 3 wherein the chamber means includes a piston movable by the key operable means in the chamber means to vary its volume.

5. The dispenser of claim 4 wherein the key operable means is supported in the housing for rotation in its unlocked position relative to the housing to move the piston.

6. The dispenser of claim 5 wherein the piston and the housing are complementarily rotationally threaded, and wherein the piston is rotatable along the threads by the key operable means to vary the volume of the chamber means.

7. The dispenser of claim 3 wherein the key operable means includes key-engaging members in recessed relation to an exterior surface of the housing.

8. The dispenser of claim 4 including a driving connection between the key operable means and the piston for moving the piston responsive to rotation of the key operable means.

* * * * *